No. 857,828. PATENTED JUNE 25, 1907.
J. J. POTTER.
NUT LOCK.
APPLICATION FILED OCT. 18, 1906.
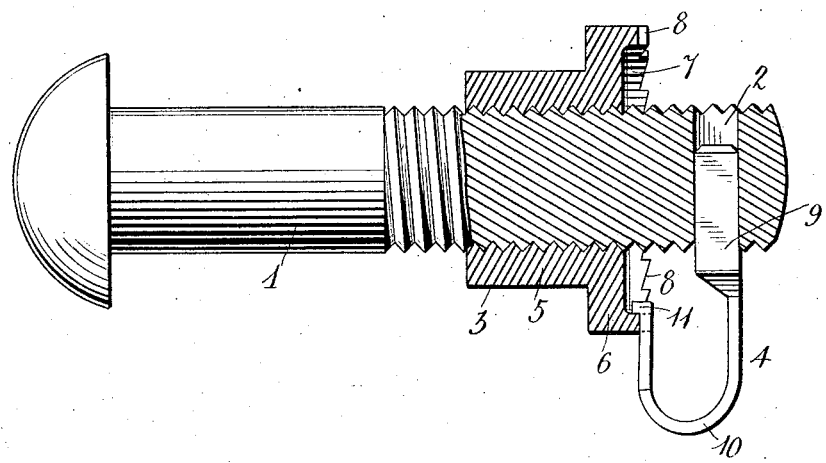
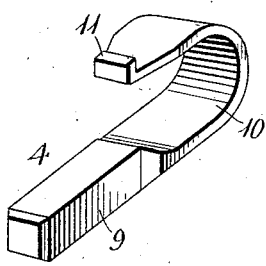
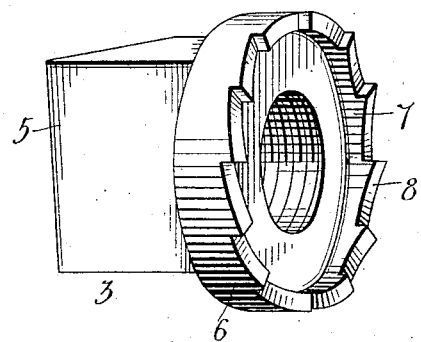
Witnesses
Inventor
James J. Potter
by
Attorneys

UNITED STATES PATENT OFFICE.

JAMES J. POTTER, OF STAUNTON, VIRGINIA.

NUT-LOCK.

No. 857,828.        Specification of Letters Patent.        Patented June 25, 1907.

Application filed October 18, 1906. Serial No. 339,559.

*To all whom it may concern:*

Be it known that I, JAMES J. POTTER, a citizen of the United States, residing at Staunton, in the county of Augusta and State of Virginia, have invented certain new and useful Improvements in Nut-Locks; and I do declare the following to be a full, clear, and exact description of the invention, such as will enable others skilled in the art to which it appertains to make and use the same.

This invention relates to nut locks.

The object of the invention is to provide a nut lock having a novel form of nut and of nut-locking member, the coaction between the two elements, when assembled with a bolt, being such that any possibility of the nut working loose and becoming detached from the bolt is obviated, and further, in which tightening of the nut to prevent rattling or its removal from the bolt may be readily and easily effected.

With the above and other objects in view, as will appear as the nature of the invention is better understood, the same consists in the novel construction and combination of a nut lock, as will be hereinafter fully described and claimed.

In the accompanying drawings, forming a part of this specification, and in which like characters of reference indicate corresponding parts,—Figure 1 is a view in elevation, partly in section, exhibiting a bolt with a nut lock of the present invention applied thereto; Fig. 2 is a perspective, detail view of the locking member used in conjunction with the nut; and Fig. 3 is a similar view of the nut.

Referring to the drawings, 1 designates a bolt which may be of any preferred construction, and provided near the terminal of its threaded portion with a transversely-disposed seat or orifice 2, that, for the purpose of the present invention, is polygonal, preferably square, in cross-section. The other elements of the lock comprise a nut 3 and a locking member, designated generally, 4. The nut 3 is provided with the usual polygonal wrench face 5, and in addition with a marginal rim 6, the outer face of which is incut to form a flange 7, that, by preference, is disposed in parallelism with the bolt opening of the nut, and is provided with ratchet teeth 8, which may be spaced apart any desired distance.

The locking member 4, which is shown in detail in Fig. 2, comprises a polygonal shank 9 to engage the seat 2, and a looped or bowed, resilient locking pawl 10, the terminal of which is provided with a toe or lug 11, that is adapted to engage with the inner wall of the flange 7, as clearly shown in Fig. 1, thereby to prevent accidental separation of the locking member from the nut. As shown in Fig. 2, the pawl is longitudinally reduced, so that the terminal carrying the toe 11 is comparatively narrow in width, but there will be sufficient body or stock in the pawl to cause it to engage with the ratchet teeth of the flange 7 with sufficient force to prevent any accidental separation or disconnection therefrom, as from jars or vibrations resulting from the passage of trains over a track employing the locking device, or from vibrations from other machinery in connection with which it may be employed.

In the use of the device, after the bolt has been assembled with the object to be clamped, the nut is turned thereon, and finally the shank of the locking member is engaged with the seat 2. By the employment of a suitable implement, such as a pair of pincers, the pawl will be compressed so as to permit the toe 11 to be positioned within the flange 7. If, at any time, as from shrinkage or the like, the nut should work loose on the bolt, it will only be necessary to tighten it with an ordinary wrench to take up any lost motion or looseness that may be present.

Having thus described my invention, what I claim as new, and desire to secure by Letters-Patent, is,—

1. The combination with a bolt provided with a transverse seat, of a nut having an outstanding flange provided with ratchet teeth, and a locking member having a shank to engage the seat, and a resilient ratchet tooth engaging pawl having a terminal toe to engage the inner wall of the nut flange.

2. The combination with a bolt provided with a transverse seat, of a nut having one face socketed and provided with ratchet teeth, and a locking member having one terminal in engagement with the seat and its other terminal in engagement with the inner rim of the socket, and an intermediate portion in engagement with the ratchet teeth.

In testimony whereof I have hereunto set my hand in presence of two subscribing witnesses.

JAMES J. POTTER.

Witnesses:
R. M. ELLIOTT,
L. O. HILTON.